Figure 1:
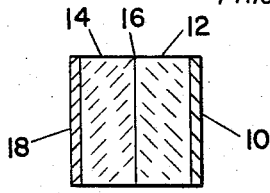

Dec. 20, 1966     G. C. HUTH     3,293,435

SEMICONDUCTOR CHARGE MULTIPLYING RADIATION DETECTOR

Filed Feb. 12, 1963

INVENTOR.
GERALD C. HUTH
BY Henry W. Kaufmann

AGENT

# United States Patent Office 3,293,435
Patented Dec. 20, 1966

3,293,435
SEMICONDUCTOR CHARGE MULTIPLYING
RADIATION DETECTOR
Gerald C. Huth, Malvern, Pa., assignor to General
Electric Company, a corporation of New York
Filed Feb. 12, 1963, Ser. No. 257,935
2 Claims. (Cl. 250—83.3)

This invention pertains to the detection of particles, more particularly those of such energy and associated wave length that they tend to penetrate solids readily and to create ionization or free electrical charges. They may be variously described as energetic particles, or energetic radiation, or ionizing particles, or radiation, or particulate radiation, inter alia.

The best known and still very useful type of detector for ionizing particles of the class described is the Geiger counter which employs the ionization of gas by such a particle, which moves through a very critically adjusted electric field, to produce a discharge or pulse of current. (Rutherford and Geiger, Proceedings of the Royal Soviety, vol. 81, page 141, 1908.) The critical adjustments required for high sensitivity of this device have caused other types to be developed. For example, scintillation counters have been produced which count, usually photoelectrically, the scintillations in a spintharis-cope type of detector. It is also known to employ reverse-biased semiconductor junctions as detectors, by causing the particles to penetrate into the depletion layer at the junction and produce pairs of charges in a region in which they are readily swept out by the applied field. However, the sensitivity of such detectors, especially to relatively low-energy particles, tends to be very low because there is appreciable probability of absorption of such particles, with usual electrode and junction geometries, before the particle reaches the depletion layer; and, even if it produces a pair in the depletion layer, the quantum efficiency is limited to one pair per particle, with no chance of multiplication, such as is effectively obtained in the Geiger counter. However, very small size, great tolerance of acceleration, and insensitivity to variations in applied potential, have caused this type of detector to be used to some extent. The low sensitivity necessitates high-gain amplifiers for the output of such a detector, and the use of reasonable gain-band width products and of band widths compatible with tolerable noise levels markedly limits the time resolution, between particles, obtainable by systems embodying such devices.

I have invented a semiconductor detector which employs a semiconductor junction of such geometry that incident particles have a very high probability of entering the depletion region if they strike the device at all; and I can operate this device with unusually high applied potentials, in such a manner that production of a hole-electron pair by an incident energetic particle permits a charge to cause additional pair production, in its transit through the depletion layer. Thus I obtain very appreciable multiplication of the initially produced charge pair, and obtain an output of many units of charge per incident particle. This amplification by charge multiplication is similar in a very general way to that obtained by the gas-filled detector; but it has the advantage that it functions at lower voltages and is not nearly so critical with respect to constancy of applied voltage. (K. G. McKay and K. B. McAfee, "Electron Multiplication in Silicon and Germanium," Physical Review, vol. 91, page 1079, September 1953; K. G. McKay, "Avalanche Breakdown in Silicon," Physical Review, vol. 94, pages 877–884, May 1954.) Since it eliminates the first stages of amplification, otherwise required with conventional semiconductor detectors, it permits the use of time resolution a number of orders of magnitude greater than those conventionally obtained, since amplifier gain and time resolution are in mutual opposition.

Basically, I provide a semiconductor device, embodying a p/n junction, in which the semiconductor crystal is shaped, e.g., lapped, to form a frustum of a cone or otherwise so shaped that one contact is very large in area compared to the other, the large-area contact being at the base of the frustum and the small-area contact being nearer to the missing apex. The semiconductor is preferably, in the present state of the art, of silicon, although it will appear from my further description that the basic principles may be applied to other semiconductors, probably some not even now in existence. The general geometry I have described has one clearly beneficial effect; because a large area of semiconductor is exposed, it permits the existence of a depletion layer extending over much of the area of the contact at the base, which area is only slightly obstructed by the intervening small-area contact. This permits even particles of low energy to enter the depletion region without having to traverse a large thickness of semiconductor material, and without having to pierce an intervening electrode. Another less apparent advantage of this geometry is that the depletion region has a minimum thickness internally of the crystal, away from the surface; the field on the surface of the crystal may be made an order of magnitude less than that inside the crystal. This permits the application to the diode of reverse biases of magnitude sufficient to produce fields great enough to produce the charge multiplication I have described, without the surface breakdown which conventionally occurs when attempts are made to operate conventional diodes at comparable potentials. The benefits obtainable in the employment of a semiconductor device of this general description as a diode rectifier are described in detail in a copending application for United States Patent filed by me and Robert L. Davies on January 30, 1963, entitled, "Semiconductor Device," and bearing Serial Number 255,037, which is assigned to the assignee of this application. I include a description of such a device herein.

Thus I achieve the generally desirable objects of providing a compact, stable detector of ionizing or energetic particles, capable of detecting particles of low energy with high efficiency, that is, of detecting a large proportion of incident low-energy particles; and of producing large signals to indicate such detection.

Figure 2:
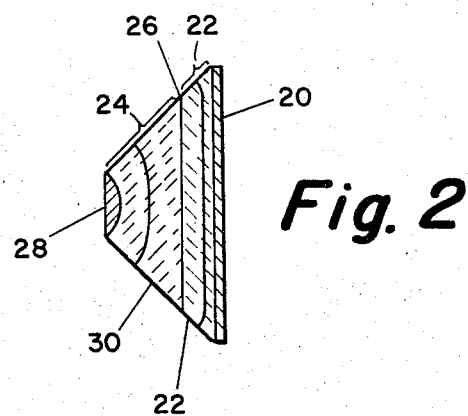
Figure 3:
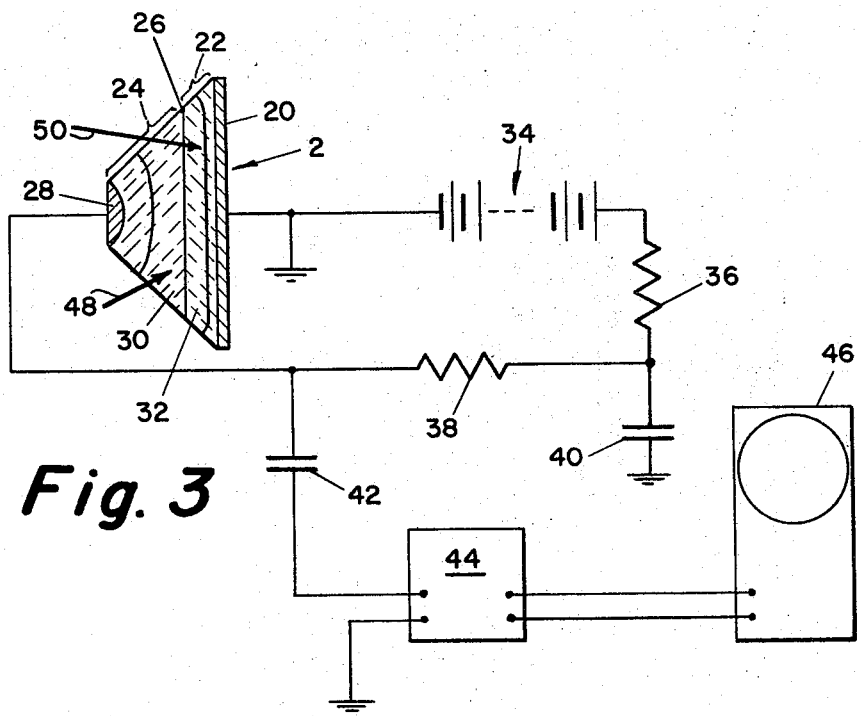

For the better understanding of my invention, I have provided FIGURES of Drawing, in which FIG. 1 represents in section a conventional diode;

FIG. 2 represents in section a diode structure suitable for employment in my invention; and FIG. 3 represents partly schematically a diode structure according to FIG. 2 connected for the practice of my invention.

Referring more specifically to FIG. 1, there is represented in section a metallic base contact 10 in intimate contact with a p-type semi-conductor 12 which is in contact with an n-type semiconductor 14 at a junction or interface 16. A metallic contact 18 provides an electrical connection to n-type semiconductor 14. It will be observed that the semiconductor portion 12 and 14 is of uniform cross section throughout, and electrodes 10 and 18 are represented as being of the same cross section. Thus, the only means of direct access to the semiconductor would be from top or bottom, as here represented. As actually conventionally constructed, the semiconductor would be quite thin, that is, small in the dimension between electrodes 10 and 18. Thus, to obtain access to the central portion of the semiconductor without passing through one of the electrodes 10 or 18, it would be necessary to penetrate one-half the breadth of the semiconductor. It will also be observed that there is a pathway over the surface of the semiconductor between electrodes 10 and 18 which, if the semiconductor combination 12–14 is very thin, will be a leakage path of very small dimensions. It is found in practice that the external leakage path here described tends to be the limiting factor in determining the maximum reverse voltage which can be applied, without producing breakdown, to a diode like that here represented.

There is represented in section in FIG. 2 a diode suitable for use in my invention in which conducting base 20 corresponds to 10 of FIG. 1, semiconductors 22 and 24 correspond to 12 and 14 of FIG. 1 with a junction 26 representing the interface between 22 and 24. Electrode 28 is the homologue of 18 in FIG. 1. It will be observed that in FIG. 2, electrode 28 is very much smaller in area than electrode 20, and that the semiconductor portion, instead of having its exposed sides parallel to each other, has them non-parallel and, indeed, is a cone with a large apex angle. In actual fact, the semiconductor preferably should constitute a much less acute cone than the representation. A convenient way of making so obtuse a cone is to take a flat piece of semiconductor and lap it to a cone whose sides depart only by a few degrees from the original plane surface of the semiconductor before lapping, forming a cone of apex semiangle nearly ninety degrees. The diode represented in FIG. 2 has been represented as it would appear with reverse bias applied, that is to say, with a positive potential applied to contact 28 and a negative potential applied to contact 20. In that case, a so-called depletion region will be found on both sides of interface or junction 26. In the n-type material 24, this is the portion marked with reference number 30, and in p-type material 22, this is the region marked with reference number 32. It will be observed that the curvature of the boundary lines marking depletion region 30 is such that the depletion region is thinnest (and the electric field therefore strongest) away from the surface of the semiconductor cone and toward the interior. Since the region of strongest field lies in the interior of the semiconductor, the limiting applied reverse potential will not be determined by the field at the surface of the semiconductor. In consequence of this fact, it is possible to increase the back bias on a diode such as that represented in FIG. 2, to such an extent that, if a charge is released in the depletion region, it will, in moving under the strong field, produce more charge pairs and therefore effectively be multiplied as in the gas multiplication achieved in the conventional Geiger counter. A conventional way of producing semiconductor diodes of this sort is to select a material of one conductivity type such as n-type, and convert a portion of it to the other type by diffusion of a dope (an electron acceptor in the present case). The residue of dope remaining on the surface may be used as an electrical contact, usually after the evaporation upon it of a more suitable metallic layer. Contacts 18 and 28 thus may be so formed; or alternatively they may be formed by evaporation of metal directly upon the semiconductor surface, the junction having been formed generally by diffusion techniques.

A diode which has actually been satisfactorily employed in the practice of my invention had the following characteristics:

A wafer of silicon of suitable purity, one-half inch in diameter and 11 mils thick was "doped" with gallium, by diffusion, to a depth of 3 mils, forming a p-type layer of that thickness, with the remaining n-type portion 8 mils thick. In terms of FIG. 2, portion 22 was 3 mils thick and portion 24 was 8 mils thick. Gold was evaporated over the doped face, corresponding to the deposition of 20 on 22, in FIG. 2. The contact corresponding to 28 was also of evaporated gold. The wafer was lapped to form a cone with an apex semiangle of about 88 or 89 degrees. The resistivity of the base (portion 22) was found to be 1500 ohm-centimeters.

It was found that, when this diode was reverse-biased, or biased in the direction of poor or difficult conduction, the leakage current remained very low up to about 600 volts, at which point so-called "punch through" or injection type breakdown occurred and it began to rise somewhat more than linearly with voltage. At this point, the back current, or leakage current, was about one-half microampere.

Referring to FIG. 3, the diode assembly 2 is represented only schematically in section, without section marks, for better legibility. A potential source 34, represented as a battery, is connected at its negative terminal to base electrode 20, which is grounded. The positive terminal of potential source 34 is connected via a filter resistor 36 to a load or current-measuring impedance 38, a resistor in the present case, the junction of 36 with 38 being by-passed to ground for varying potentials by capacitor 40. The remaining end of resistor 38 is connected to terminal 28 of diode 2, and via a coupling capacitor 42 to the input of an amplifier 44, whose output is connected to the input of an oscilloscope 46, but may equally well be connected to any other utilization device, such as a multichannel analyzer to analyze the pulses according to pulse height grouping, or to a simple pulse counter to count the number of pulses. In the embodiment actually employing the diode described hereinabove, the potential of source 34 was 600 volts; resistor 36 had a value of 1 megohm, 38 had a value of 22 megohms; capacitors 40 and 42 were each of 0.02 microfarad capacitance.

Arrows 48 and 50 represent ionizing particles penetrating, respectively, into depletion regions 30 and 32. Since charge pairs may be produced in either p-type or n-type material, penetration into either will produce such pairs and, in either case, the minority carrier will be accelerated by the prevailing field and contribute to a pulse of current until it crosses the junction to become lost in the plurality of charges of its own sign. In conventional diodes such as those represented schematically by FIG. 1, the reverse potentials which can be applied without breakdown are insufficient, in general, to permit of avalanche multiplication. Furthermore, ionizing particles or radiation can enter the depletion region only by piercing the metallic barrier 10 or 18, or by entering from the side into the semiconductor material. By employing a diode made in accordance with my joint invention with Davies, it is possible for ionizing particles to enter anywhere over a large area of the exposed semiconductor surface. This has the advantage of permitting relatively low-energy particles, of energy of less than 100 kiloelectronvolts, to enter the detector readily and be counted, and is a particular advantage of my invention. However, the possibility of applying high potentials to a diode such as the one represented in FIG. 2 also permits the practical utilization of the effect of avalanche multiplication to obtain amplification of the signal originally produced by the charge pair resulting from the entry of the ionizing particle.

The operation of the electronic circuitry represented in FIG. 3 is conventional. Resistor 36 and capacitor 40 form a conventional resistive-capacitive filter section; resistor 38 constitutes a load impedance in series with the detector unit, diode 2. Currents flowing through diode 2 cause the drop across resistor 38 to vary, and these variations in potential are transmitted via blocking or coupling capacitor 42 to the input of pulse amplifier 44. The use of capacitor 42 keeps the high continuous potential at terminal 28 from being applied to the input of pulse amplifier 44.

While the smaller terminal 28 has been represented in this particular embodiment as applied to n-type material, it is, of course, completely within my teaching to have the smaller terminal applied to p-type material, and the large base terminal 20 applied to n-type material; in any event, the potential applied from potential source 34 or its equivalent must be in the direction of poor conduction or what is commonly described as blocking or cutoff, or reverse-biased.

Similarly, while the particular diode embodiments represented have been in the form of truncated cones, it is evident that geometric variations are possible without departing from the principles I have taught.

The appended claims are written in subparagraph form, in compliance with a recommendation of the Commissioner of Patents, to render them easier to read. This particular manner of division into subparagraphs is not necessarily indicative of a particular relative importance or necessary subdivision of the physical embodiment of the invention.

What is claimed is:

1. A device for detecting energetic particles comprising:
    (a) a semiconductor junction of two different conductivity types, a first contact of large area in contact with semiconductor of the first said conductivity type, a second contact of small area in contact with semiconductor of the second said conductivity type, the said junction being of larger area than the said second contact, the semiconductor being beveled so that its cross section at a given distance from the said first contact is less than that at any lesser distance from the said first contact;
    (b) means for applying potential across the said semiconductor junction by connection to the two said contacts, in the direction of poor conduction of the said junction, and of such magnitude as to produce "avalanche" multiplication of minority carriers in the charge depletion region of the said semiconductor;
    (c) means for detecting flow of charges in the said semiconductor between the said contacts.

2. A device for detecting energetic radiation, comprising, in combination:
    (a) a semiconductor silicon junction diode comprising a negative portion which tapers with decreasing area toward a first electrode of small area, and a positive portion of the said diode having attached to it a second electrode of large area;
    (b) a current-measuring impedance connected in series with one of the said electrodes; and
    (c) a source of potential less than the breakdown value of reverse potential of the said diode and within the range in which avalanche multiplication of charge occurs connected in series with the said electrodes and the said impedance in a direction opposite to the direction of easy current flow through the diode.

References Cited by the Examiner

UNITED STATES PATENTS

| | | | |
|---|---|---|---|
| 2,672,528 | 3/1954 | Shockley | 317—235 |
| 2,991,366 | 7/1961 | Salzberg | 250—83.3 |
| 3,110,806 | 11/1963 | Denny | 250—83.3 |
| 3,126,483 | 3/1964 | Hoalst | 250—83.3 |

RALPH G. NILSON, *Primary Examiner.*

JAMES W. LAWRENCE, FREDERICK M. STRADER, *Examiners.*

A. R. BORCHELT, *Assistant Examiner.*